US008123147B2

(12) United States Patent
Fulkerson et al.

(10) Patent No.: US 8,123,147 B2
(45) Date of Patent: Feb. 28, 2012

(54) POWDER COATING SYSTEM AND COMPONENTS

(75) Inventors: Terrence M. Fulkerson, Brunswick, OH (US); Michael R. Sanner, Amherst, OH (US); Brian D. Mather, North Olmsted, OH (US); Joseph G. Schroeder, North Royalton, OH (US); Jeffery Edward Dailidas, Barrington, IL (US)

(73) Assignee: Nordson Corporation, Westlake, OH (US)

( * ) Notice: Subject to any disclaimer, the term of this patent is extended or adjusted under 35 U.S.C. 154(b) by 254 days.

(21) Appl. No.: 12/148,616

(22) Filed: Apr. 21, 2008

(65) Prior Publication Data

US 2008/0277507 A1 Nov. 13, 2008

Related U.S. Application Data

(60) Provisional application No. 60/928,390, filed on May 9, 2007.

(51) Int. Cl.
*A01G 23/10* (2006.01)

(52) U.S. Cl. ................ 239/3; 239/79; 239/85; 239/290; 239/296; 239/433; 239/499; 239/525; 239/575; 239/590; 239/597; 239/601; 239/690; 239/697; 239/704; 239/707; 118/621; 118/629

(58) Field of Classification Search ................ 239/3, 79, 239/85, 290, 296, 298, 433, 462, 499, 504, 239/525, 526, 597–599, 601, 690, 697, 704, 239/706–708, 575, 590, 590.3; 118/621, 118/629
See application file for complete search history.

(56) References Cited

U.S. PATENT DOCUMENTS

| | | | | |
|---|---|---|---|---|
| 3,590,318 | A * | 6/1971 | Probst et al. | 239/597 |
| 3,617,000 | A * | 11/1971 | Probst et al. | 239/706 |
| 4,380,320 | A | 4/1983 | Hollstein et al. | |
| 4,399,945 | A | 8/1983 | Ruud | |
| 4,401,275 | A | 8/1983 | Ruud | |
| 4,630,777 | A * | 12/1986 | Hollstein et al. | 239/707 |
| 4,638,951 | A | 1/1987 | Gabriel | |
| 4,790,485 | A * | 12/1988 | Yamamoto | 239/707 |
| 4,830,279 | A | 5/1989 | Crum et al. | |
| 4,987,001 | A | 1/1991 | Knobbe et al. | |
| 5,368,237 | A | 11/1994 | Fulkerson | |
| 5,520,735 | A | 5/1996 | Mulder | |

(Continued)

FOREIGN PATENT DOCUMENTS

EP 0 718 043 6/1996

OTHER PUBLICATIONS

International Search Report for International Application No. PCT/US2008/005068 dated Nov. 13, 2008.

*Primary Examiner* — Steven J Ganey
(74) *Attorney, Agent, or Firm* — Calfee, Halter & Griswold LLP

(57) ABSTRACT

A nozzle for a powder spray gun optionally includes an internal filter that allows air to be added to the powder flow within the nozzle shell. The nozzle may optionally include an off-axis outlet slot relative to a main flow axis of the powder into the nozzle shell so that powder encounters an obstruction before exiting through the outlet slot.

54 Claims, 11 Drawing Sheets

U.S. PATENT DOCUMENTS 5,759,271 A * 6/1998 Buschor .................... 239/690
5,820,941 A 10/1998 Felton et al.
D462,740 S 9/2002 Schroeder et al.
6,478,242 B1 11/2002 Knobbe et al.
D469,847 S 2/2003 Schroeder et al.
D497,407 S 10/2004 Mather
D499,463 S 12/2004 Mather
D532,863 S 11/2006 Mather et al.
D532,864 S 11/2006 Mather et al.
7,401,745 B2 * 7/2008 Lacchia .................... 239/79
2005/0126476 A1 6/2005 Shutic et al.
2005/0229845 A1 10/2005 Mather et al.

* cited by examiner

POWDER COATING SYSTEM AND COMPONENTS

RELATED APPLICATIONS

This application claims the benefit of pending U.S. provisional patent application Ser. No. 60/928,390 filed on May 9, 2007 for NOZZLE WITH INTERNAL RAMP, the entire disclosure of which is fully incorporated herein by reference.

TECHNICAL FIELD OF THE DISCLOSURE

The disclosure relates generally to apparatus and methods for applying powder coating material onto a surface. More particularly, the disclosure relates to nozzles for powder spray guns.

BACKGROUND OF THE DISCLOSURE

Applying a coating material onto the surface of a body is commonly done. In a typical system, one or more spray guns directs a flow of atomized powder toward an object to be coated. A nozzle is used to shape the spray pattern. Pressurized air may also be used to shape the spray pattern. Spray technology may include electrostatic and non-electrostatic methods.

SUMMARY OF THE DISCLOSURE

The present disclosure contemplates various inventions relating to nozzles for a powder spray gun. In accordance with one inventive aspect, a nozzle is provided with an air porous filter that allows air to be added to a powder flow before the powder exits the nozzle. In one embodiment, a spray nozzle comprises a shell and a porous filter disposed in the shell.

In accordance with another inventive aspect of the disclosure, a spray nozzle provides a powder flow path along an internal main flow axis, and an outlet that is off-axis relative to the main flow axis. In one embodiment, a nozzle body is provided with an off-axis outlet relative to a main flow axis so that powder encounters an obstructing surface before exiting through the nozzle. In alternative embodiments, an outlet flow axis may be parallel or non-parallel to the powder flow path main flow axis. In further alternative embodiments, the main flow axis may coincide with an inlet flow axis, a longitudinal axis of the nozzle, or both. In still a further alternative embodiment, the inlet flow axis may coincide with a main flow axis through a portion of the nozzle.

The present disclosure also contemplates inventive methods associated with the use of such a nozzle as set forth herein, as well as a method for directing powder along a first path, and causing the powder to change direction before exiting an offset opening to produce a spray pattern. In one embodiment, the method includes causing the powder to impact a surface to change direction of the powder before the powder exits an opening to produce a spray pattern.

These and other inventive aspects and features of the disclosure will be readily apparent from a reading of the following detailed description of the exemplary embodiments in light of the accompanying drawings.

DETAILED DESCRIPTION OF THE EXEMPLARY EMBODIMENTS

1. Introduction

Figure 1:
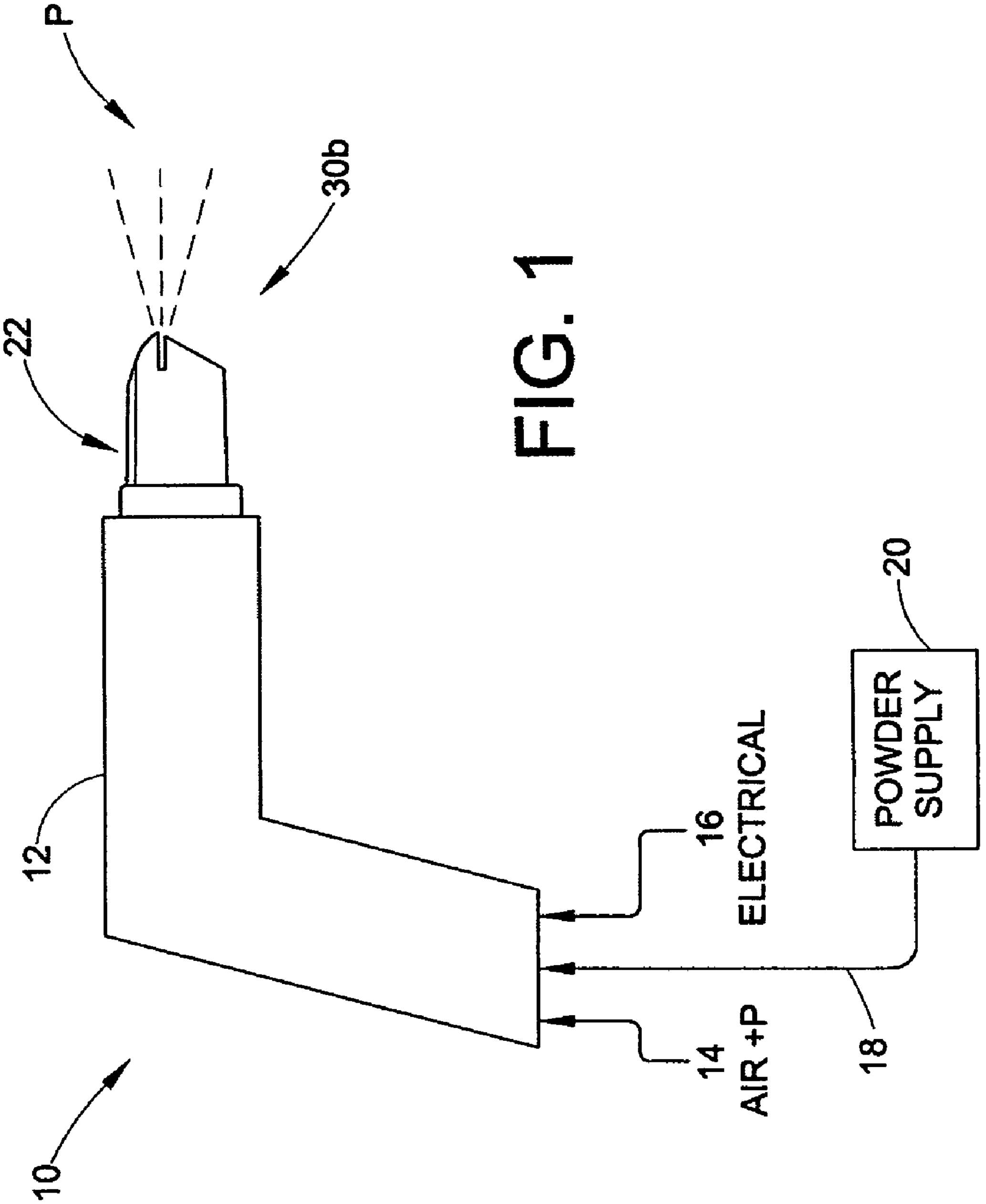
FIG. 1 is a simplified schematic of a material application system using an embodiment of the inventions.

The present disclosure is directed to apparatus and methods for application of powder coating material onto a workpiece. In the exemplary embodiments, the inventions are illustrated herein for use with nozzles for a manually operated electrostatic powder spray gun, and in a specific embodiment the nozzle is particularly suited for a high density supply of powder. However, the inventions are not limited to use in high density applications, nor are they limited to the particular type of spray gun illustrated in the drawings. For example, the present inventions may find application in automatic spray guns, as well; and may further be used with electrostatic and non-electrostatic spray technologies.

The embodiments are described herein with particular reference to a material application system, such as for example may be used for the application of powder coating materials such as paint, lacquers and so on. While the described embodiments are presented in the context of a powder paint coating material application system, those skilled in the art will readily appreciate that the inventions, inventive aspects and concepts may additionally be used in many different dry particulate material application systems, including but not limited in any manner to: talc on tires, super-absorbents such as for diapers, food related material such as flour, sugar, salt and so on, desiccants, other food seasonings, powder detergents, fertilizers, release agents, and pharmaceuticals. These examples are intended to illustrate the broad application of the inventions for application of particulate material to objects or surfaces. The specific design and operation of the material application system selected provides no limitation on the present inventions except as otherwise expressly noted herein. Thus any use herein of the terms 'powder coating' or 'powder' is intended not as a term of art and not to be exclusive but rather included within the broad understanding of any dry particulate material.

While the inventions are described and illustrated herein with particular reference to various specific forms and functions of the apparatus and methods of the exemplary embodiments thereof, it is to be understood that such illustrations and explanations are intended to be exemplary in nature and should not be construed in a limiting sense. For example, the inventions may be utilized in any powder spray system involving the application of powder coating material to a workpiece. The coated surface may be an interior or exterior surface of the workpiece, and the surface profile may be of any shape including but not limited to generally planar, curvilinear and other surface geometries, end surfaces, and so on.

While various inventive aspects, concepts and features of the inventions may be described and illustrated herein as embodied in combination in the exemplary embodiments, these various inventive aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and soon—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

2. Detailed Description

With reference to FIG. 1, an exemplary embodiment of typical powder spray system 10 is illustrated in simplified schematic form. The system 10 may include a spray gun 12, which may be any spray gun design that is suited to the particular powder coating operation to be performed. An example of a commercially available spray gun is model PRODIGY® available from Nordson Corporation, Westlake, Ohio, but this is but one of many different types of spray guns that may be used, including guns presently available or later developed. The gun 12 may receive a number of inputs, including pressurized air 14, and in the case of an electrostatic gun an electrical power input 16. The spray gun 12 also receives a flow of powder coating material, typically through a feed hose 18 from a supply 20 that may include a pump. Many different types of powder supply systems may be used, and in the exemplary embodiments herein the supply 20 provides powder in dense phase meaning that the powder flow through the hose 18 into the spray gun 12 is a rich mixture of powder and air, with a high ratio of powder to air. In a dilute phase, the powder flow has a lean mixture with a low powder to air ratio. The present inventions are not limited to dense phase powder supply, but are especially useful therewith. An exemplary powder coating system suitable for use with the inventive aspects described herein is described in United States Patent Application Publication No. US 2005/0126476 A1 published on Jun. 16, 2005, the entire disclosure of which is fully incorporated herein by reference and filed herewith.

By "dense phase" is meant that the air present in the particulate flow is about the same as the amount of air used to fluidize the material at the supply such as a feed hopper. As used herein, "dense phase" and "high density" are used to convey the same idea of a low air volume mode of material flow in a pneumatic conveying system where not all of the material particles are carried in suspension. In such a dense phase system, the material is forced along a flow passage by significantly less air volume, with the material flowing more in the nature of plugs that push each other along the passage, somewhat analogous to pushing the plugs as a piston through the passage. With smaller cross-sectional passages this movement can be effected under lower pressures.

In contrast, conventional flow systems tend to use a dilute phase which is a mode of material flow in a pneumatic conveying system where all the particles are carried in suspension. Conventional flow systems introduce a significant quantity of air into the flow stream in order to pump the material from a supply and push it through under positive pressure to the spray application devices. For example, most conventional powder coating spray systems utilize Venturi pumps to draw fluidized powder from a supply into the pump. A Venturi pump by design adds a significant amount of air to the powder stream. Typically, flow air and atomizing air are added to the powder to push the powder under positive pressure through a feed hose and an applicator device. Thus, in a conventional powder coating spray system, the powder is entrained in a high velocity high volume of air, thus necessitating large diameter powder passageways in order to attain usable powder flow rates.

As compared to conventional dilute phase systems having air volume flow rates of about 3 to about 6 cfm (such as with a Venturi pump arrangement, for example), the present invention may operate at about 0.8 to about 1.6 cfm, for example. Thus, in the present invention, powder delivery rates may be on the order of about 150 to about 300 grams per minute for example.

Dense phase versus dilute phase flow can also be thought of as rich versus lean concentration of material in the air stream, such that the ratio of material to air is much higher in a dense phase system. In other words, in a dense phase system the same amount of material per unit time is transiting a cross-section (of a tube for example) of lesser area as compared to a dilute phase flow. For example, in some embodiments of the present invention, the cross-sectional area of a powder feed tube is about one-fourth the area of a feed tube for a conventional Venturi type system. For comparable flow of material per unit time then, the material is about four times denser in the air stream as compared to conventional dilute phase systems.

In general, dense phase delivery is performed by a pump that operates to pull material into a pump chamber under negative pressure and discharge the material under positive pressure with a low air volume as noted above.

The spray gun 12 further includes a nozzle assembly 22. The nozzle assembly 22 produces a desired spray pattern P of the powder coating material. The present disclosure is directed to a number of inventive aspects of the nozzle assembly.

Figure 2:
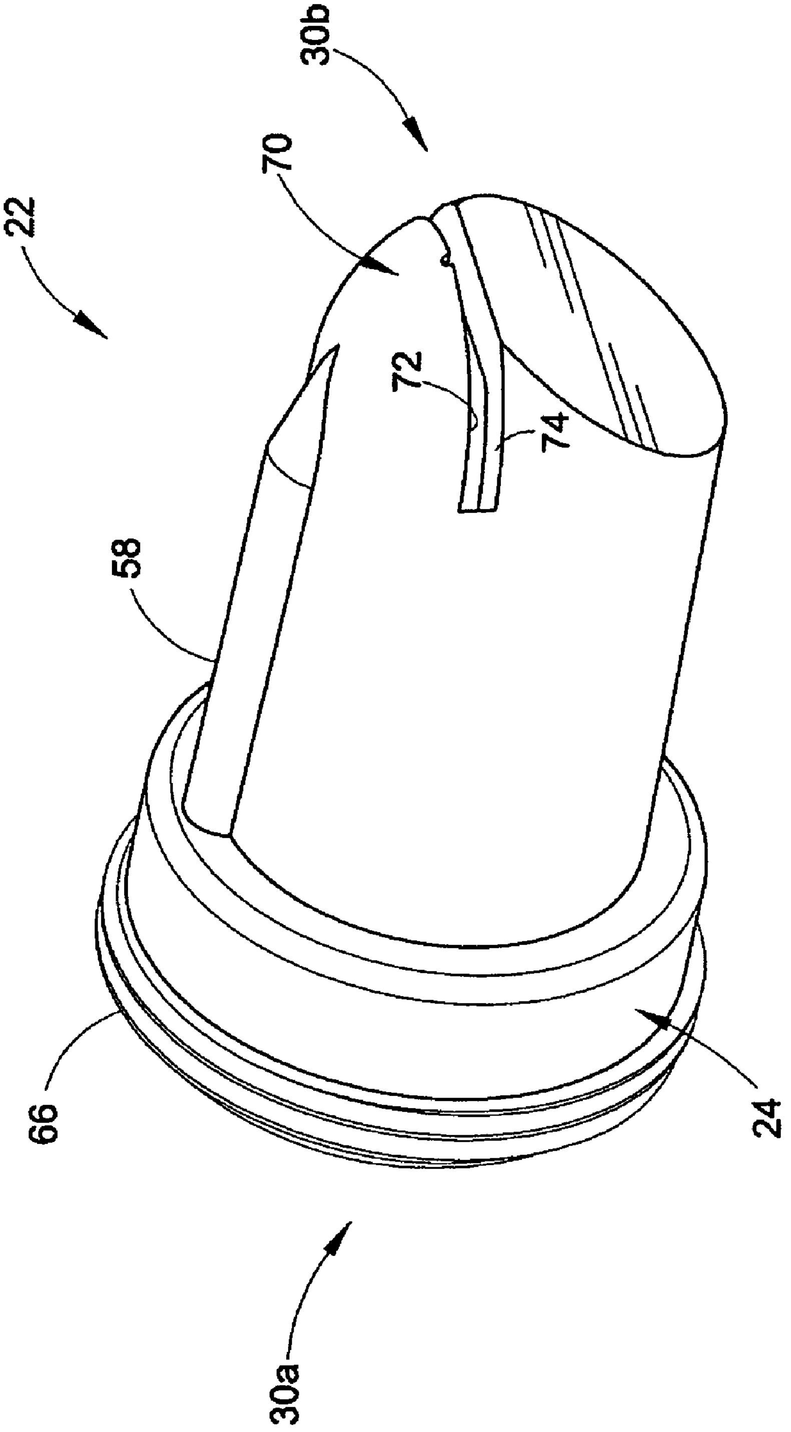
FIG. 2 is a perspective of a nozzle assembly as an exemplary embodiment of the inventions.
Figure 3:
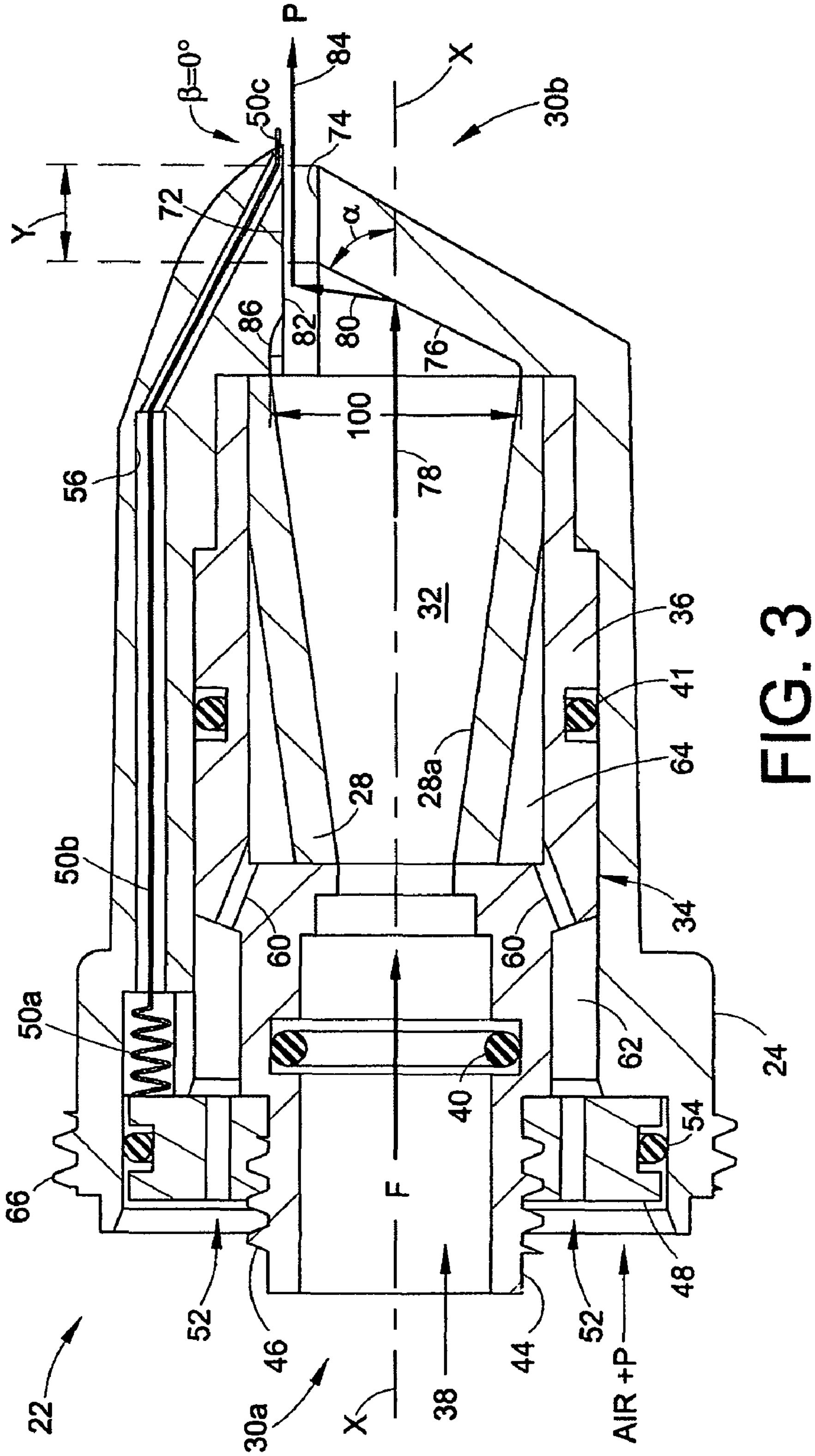
FIG. 3 is a longitudinal cross-section of the nozzle assembly of FIG. 2, taken along the line 3-3 in FIG. 6.
Figure 4:
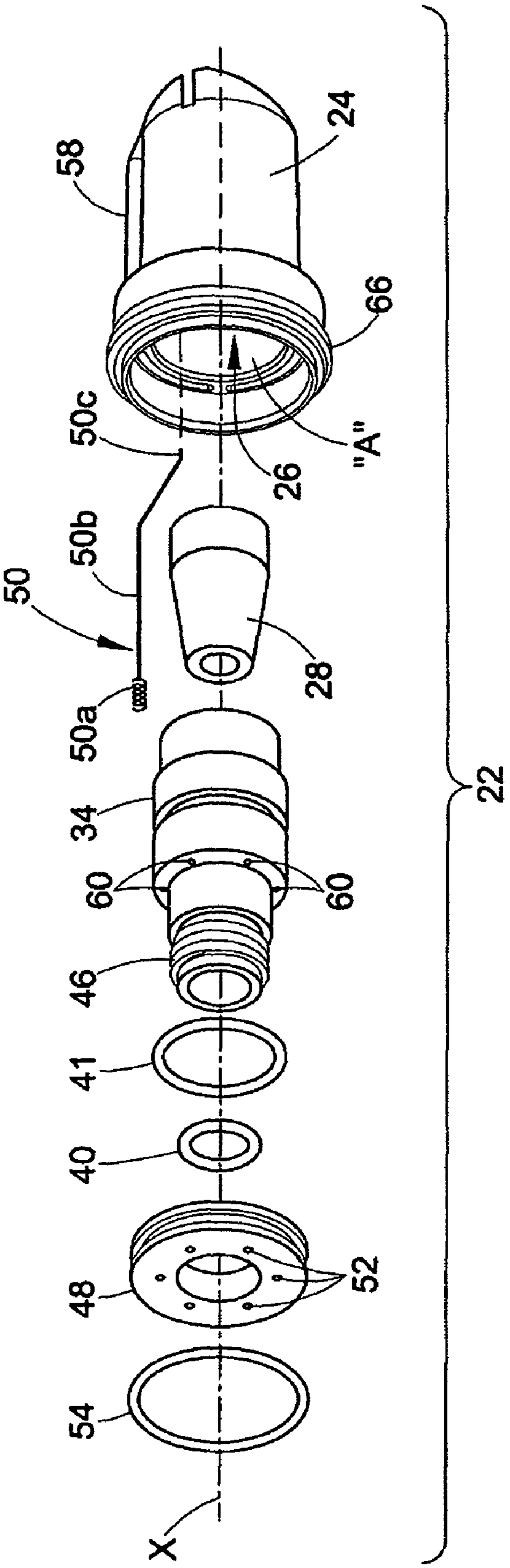
FIG. 4 is an exploded perspective of the nozzle assembly of FIG. 2.
Figure 6:
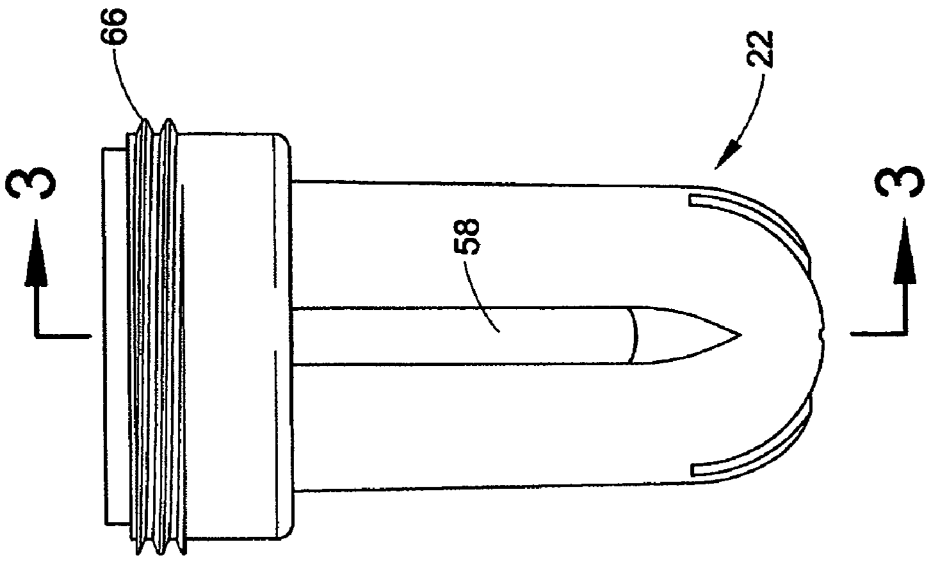
FIG. 6 is a top view of the nozzle assembly of FIG. 2.
Figure 5:
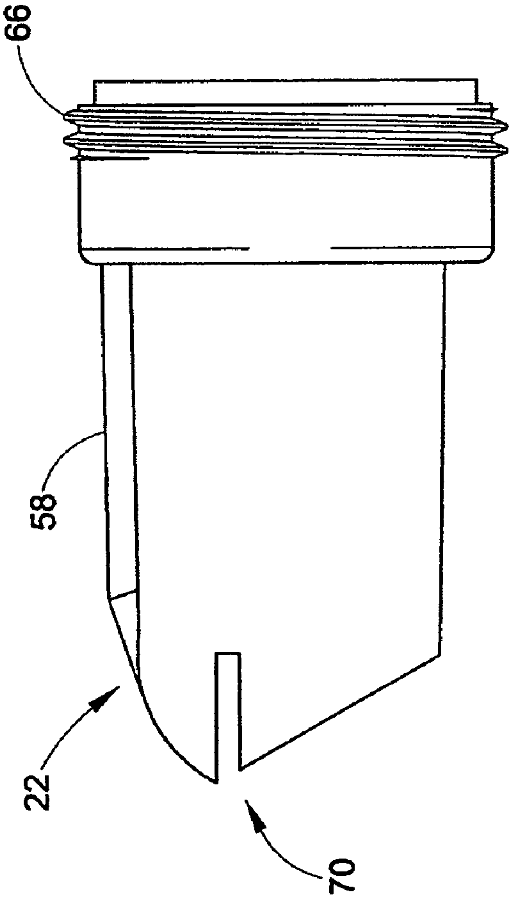
FIG. 5 is a side elevation of the nozzle assembly of FIG. 2.

FIGS. 2-4 illustrate an exemplary embodiment of the nozzle assembly 22, wherein FIG. 2 is a perspective illustration, FIG. 3 is a longitudinal cross-section, and FIG. 4 is an exploded perspective.

The nozzle assembly 22 includes a nozzle shell or body 24 that may be a hollow generally cylindrical structure. The shell 24 may be machined but it is preferred to make the shell by molding. The shell 24 has a central longitudinal axis X along which the powder flow F initially flows into and through a portion of the nozzle assembly 22. Although the powder inlet preferably coincides with the central longitudinal axis X, such is not required.

A number of components may be slip fit inserted into the interior space 26 (FIG. 4) of the shell 24. These components may include an optional porous filter 28 having a generally frusto-conical interior shape as best illustrated in FIG. 3. The porous filter 28 allows air to pass there through for adding air into the powder flow stream F. The powder stream F enters the back or inlet end 30*a* of the nozzle assembly 22 and passes through the interior volume 32 of the porous filter 28 towards the nozzle front or outlet end 30*b*. An exemplary material for the optional porous filter 28 is sintered polypropylene, which may be molded and is commonly used in powder coating systems for fluidizing beds, for example. The particular form and material of the filter 28 is optional and in some applications may not be needed. Alternatively, the filter member 28 may be used in nozzle assemblies that do not include the offset nozzle and related concepts herein.

For dense phase powder flow, the added air may be useful to help atomize the powder within the nozzle assembly 22 before the powder exits. The amount of air added to the powder flow also may be used to control the density distribution and/or shape of the output spray pattern P. The air flow into the conical interior 32 may also help contain the majority of the powder to flow along and near the axis X as it flows through the filter 28, although lighter powder particles or fines may tend to spread outward towards the filter interior surface 28*a*. It should be noted that reference herein to "flow path" or "flow" along an axis is not intended to imply that all or even most of the powder particles are precisely on the axis. Those skilled in the art will readily understand that while a large portion or majority of powder particles may be in a direction that can be thought of as axial or along an axis, powder flow tends to be more of a pattern having a general direction of flow, but with many powder particles spreading out, sometimes swirling, impacting other powder particles and so on. Thus, powder flow within the nozzle region 32 will be generally in a forward direction along the axis X but powder will tend to flow within the entire volume due to flow turbulence, different weight particles, velocities and so on. On the outlet end, the outlet spray pattern may be in many different shapes such as fan shaped, or may be somewhat amorphous like a cloud, but will have a general flow direction along an axis toward the workpiece.

The filter 28 may be retained inside the nozzle shell 24 with an insert 34. The insert 34 may also be a molded part, for example, or manufactured any other convenient way, and typically made of plastic such as DELRIN AF™ but may be any suitable material. The insert 34 includes an enlarged first inner cylindrical forward portion 36 that may receive and hold the filter 28 in a press fit manner. The insert 34 may further include a second rearward cylindrical portion 38 that receives and retains an end of a feed tube or supply hose (not shown). An o-ring 40 or other suitable seal may be used to seal around the exterior of the feed tube so that powder does not flow back into the spray gun interior. Another seal 41 such as an o-ring for example, may be provided to contain powder and air from passing back out of the nozzle assembly 22 along the outer diameter of the insert 34.

A back end 44 of the insert 34 may include threads 46 in order to threadably retain an electrode ring 48. The electrode ring 48 may be electrically conductive so as to provide an electrical connection or circuit between an electrode assembly 50 and a power supply (not shown) that is typically mounted inside the spray gun 12 housing or is externally provided. The electrode ring 48 and the electrode assembly 50 may be used in electrostatic spray gun embodiments. The electrode ring 48 may also include one or more air passages 52. The electrode ring 48 fits within a cylindrical portion of the back end 30*a* of the nozzle shell 24, and may also include an outer seal or o-ring 54 to contain powder and pressurized air within the nozzle 22 interior. The insert 34, filter 28, seals 41, 40 and 54, and the electrode ring 48 may be a fully assembled subassembly that is inserted into the nozzle shell 24.

The electrode assembly 50 may include a conductive spring portion 50*a* and an extended conductor portion 50*b* that passes through a channel 56. The extended conductor portion 50*b* extends to the front of the nozzle shell with a distal end that exits out of the nozzle shell to form an electrode tip 50*c*. The electrode tip 50*c* is preferably positioned in close proximity to the outlet spray pattern P so as to apply an electrostatic charge to the powder. The channel 56 may be formed in an optional external rib 58 on the outside of the nozzle shell 24. For non-electrostatic gun embodiments, the electrode ring, or a non-conductive diffuser ring may be used to provide a flow of pressurized air into the interior of the nozzle assembly 12.

The nozzle insert 34 may further include air passages 60. These air passages provide fluid communication between a first air volume 62 that is present between the insert 34 and the shell 24, and a second air volume 64 that is present between the outer surface of the filter 28 and the interior surface of the forward cylindrical portion 36 of the insert. Pressurized air is thus able to enter the back end of the nozzle assembly 22 when the nozzle assembly 22 is installed on the forward end of the spray gun housing (the spray gun 12 is provided with air channels—not shown—that supply pressurized air to the back end of the nozzle shell 24). This pressurized air flows through the air passages 52 in the electrode ring 48, through the first volume 62, through the air passages 60 in the insert 34, into the second volume 64 and then through the filter 28 into the interior volume 32 of the filter and mixes with the powder flow F passing there through. The nozzle shell 24 may be provided with threads 66 to attach the nozzle assembly 22 to the front end of the spray gun 12 housing, but other attachment methods and structures may be used as needed including non-threaded attachment techniques.

Figure 10:
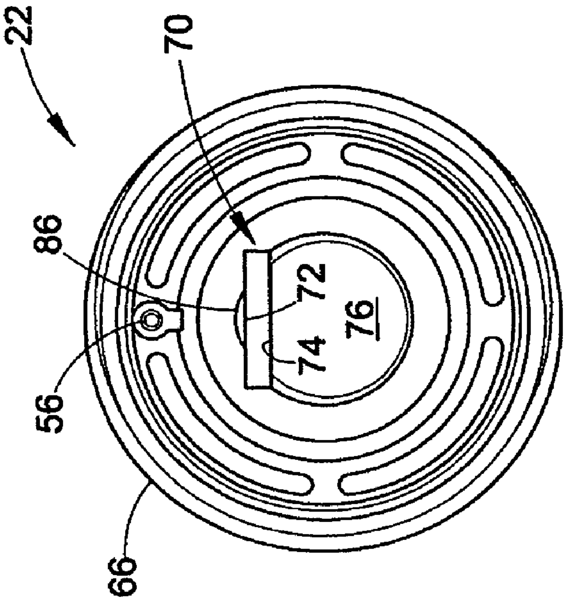
FIG. 10 is a rear view of the nozzle assembly of FIG. 2.
Figure 9:
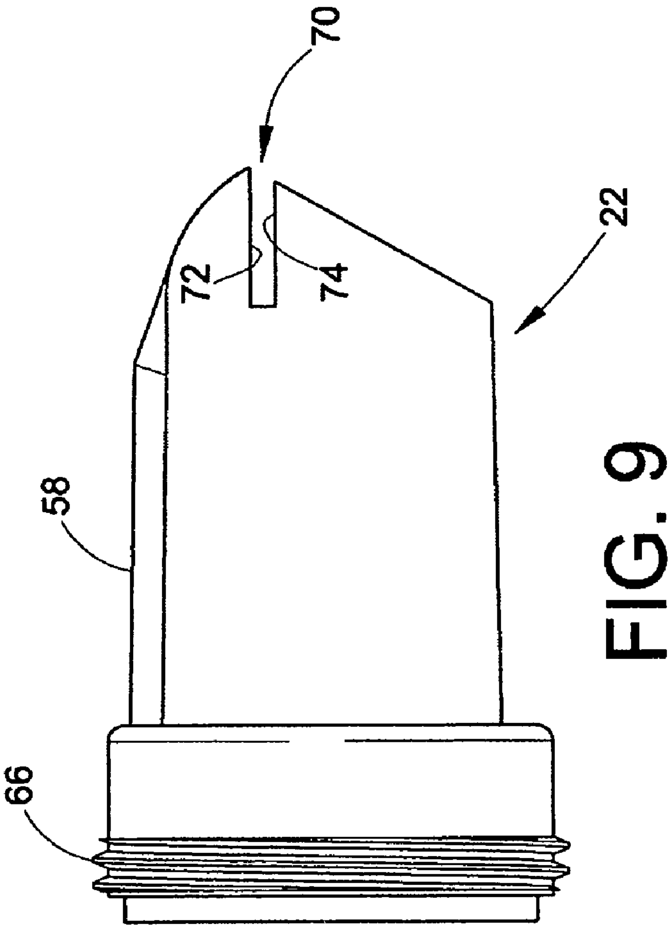
FIG. 9 is a second side elevation of the nozzle assembly of FIG. 2.

The forward portion of the nozzle shell 24 has a number of significant features that may be used alone or in various combinations and sub-combinations to achieve desired spray patterns or shapes, velocity, direction and density distributions of the output spray pattern P. FIGS. 5-10 illustrate additional exterior views of the nozzle shell 24 (note that FIG. 10 is a rear view of the shell 24 and therefore primarily shows interior features thereof.)

The nozzle shell 24 includes an off center or off-axis outlet, in this embodiment in the form of a slot 70, through which the powder exits the nozzle assembly 22 as an outlet spray pattern P. The outlet slot 70 is "off axis" in the sense that it is radially spaced or offset from the flow axis X of the powder flow F. The flow axis X, which in this embodiment also is but need not be the central longitudinal axis of the nozzle assembly 22, refers to the directional axis of the main powder flow through the nozzle assembly 22, thus also being defined in the exemplary embodiment by the central axis of symmetry of the conical filter 28 in this embodiment. The outlet slot 70 in the exemplary embodiment is defined in part by two generally parallel surfaces, first surface 72 and second surface 74. Although in the exemplary embodiment these two surfaces are generally flat and parallel to each other, as well as generally parallel to the axis X, this configuration is not required in all cases. An advantage of the illustrated slot 70 design is that it helps direct the exiting powder flow direction to generally align parallel with the axis X. Thus, even though the outlet 70 is radially off center or off axis from the main flow axis X, the exiting powder spray pattern P may be viewed as flowing in a direction that is generally parallel to the central axis X. Alternatively, an outlet 70 may be angled away or toward the main flow axis X (for example when it is desired to have a direction to the outlet spray pattern P that is not necessarily parallel to the central axis X.) Thus, as used herein, an off center or off axis outlet or slot 70 refers to the nozzle outlet 70 having a portion or significant portion thereof being radially spaced from the axis of main powder flow inside the nozzle. The term off center or off axis thus does not necessarily imply nor require that the outlet powder spray pattern does not cross the axis X or that the outlet or slot 70 is not angled at an angle relative to the axis X to provide non-axial flow direction of the outlet spray pattern.

The slot surfaces 72 and 74 need not be generally parallel to each other and need not be necessarily flat, but may be shaped appropriately to achieve a desired outlet spray pattern.

By providing an off center slot 70, a first internal surface 76 having a first slope or angle $\alpha$ relative to the central axis X may be formed internal the shell 24. This first internal surface will present an obstruction to the main volume of powder flowing along axis X through the region 32, as represented by the first heavy arrow 78. Thus, most of the powder entering the nozzle assembly 22 will impinge upon this first obstructing surface 76 before having an opportunity to exit the nozzle outlet 70. The first surface 76 may be generally flat, curved or have any profile as needed to achieve a desired internal flow and outlet spray pattern. The main powder flow 78 is thus redirected as represented by the second heavy arrow 80, towards a second surface 82 that has a second slope at an angle $\beta$ relative to the main flow axis X. In the exemplary embodiment, the angle $\beta$ is about zero degrees (so that surfaces 82,72 are generally parallel to axis X), and the second surface 82 is also part of or the same as the surface 72 that in part defines the slot 70. In other embodiments, however, $\beta$ may be an angle other than zero and/or the surface 82 may have a different profile or contour than the surface 72.

The two impact surfaces 76 and 82 may be used to create internal turbulence within the powder flow before exiting the nozzle through the slot 70. This turbulence helps to atomize the powder—especially in the case of dense phase powder flow—so as to avoid the need for a large volume of pressurized air as part of the atomizing process. Thus a well atomized powder flow out of the nozzle slot 70 can be achieved, even for dense phase powder, without adding a lot of atomizing air, thus maintaining the dense phase characteristic of the powder. This atomization and turbulence also may be used to achieve a generally uniform density distribution of powder within the output spray pattern shape and direction when so desired.

The surfaces 72 and 74 that define in part the slot 70 preferably coextend along a distance Y of sufficient length that the output spray pattern is generally along the direction of the outlet or slot 70 axis as represented by the third heavy arrow 84. This is not a required feature though, depending on the desired outlet spray pattern.

The angle $\alpha$, and also to some extent the angle $\beta$, may be selected based on a number of factors. Since a fairly high velocity flow of powder may impact the first surface 76, the steeper the angle $\alpha$ the greater will be the atomization and turbulence produced. However, the steeper angle may increase the amount of impact fusion of powder particles on the surface 76. If the amount of powder that adheres to the surface 76 increases, overall performance of the nozzle may become compromised. Therefore, there may be a tradeoff in how steep the angle $\alpha$ will be. We have found that about 62° works well, but this is only an exemplary value and may be changed as needed for a specific application. Note that even though the second slope angle $\beta$ (as defined) is about zero in the exemplary embodiment, the surface 82 presents a second obstructing surface to the powder flow that is coming off the first obstructing surface 76. In other words, the directional arrow 80 illustrates that the powder flow impacts the second surface 82 at a fairly steep angle thus facilitating turbulence and atomization. In effect then, we are using the kinetic energy and momentum of the powder flow into the first surface to create atomization and to produce a desired output spray pattern shape, direction and weight/mass distribution. It may be desirable in some applications to use a low impact fusion material, including but not limited to, for example, Delrin AF™, for the nozzle shell 24 or at least for the obstructing surface 76 and other surfaces the powder may impact.

The second surface 82 not only may increase turbulence but also may be used with the surfaces of the slot 70 to redirect the powder flow back on a path 84 that is generally parallel the axis X or other desired direction.

As noted hereinabove, the main mass or volume of powder flow through the region 32 will tend to be along the axis X. However, fines and other lighter particles may tend to spread out along the interior surface 28*a* where much of the air also tends to flow. A third directional surface 86 may optionally be provided near the inlet to the slot 70 to redirect these outer particles back into the main powder flow. The third surface 86 may have any suitable shape to achieve this result, and in the exemplary embodiment is realized in the form of a curved concave surface.

The first surface 76, and also in appropriate situations the second surface 82, may have a profile other than straight (as viewed in the cross-section of FIG. 3) in order to facilitate atomization, mass distribution and turbulence, including but not limited to concave and convex profiles, more complex profiles and so on.

Figure 8:
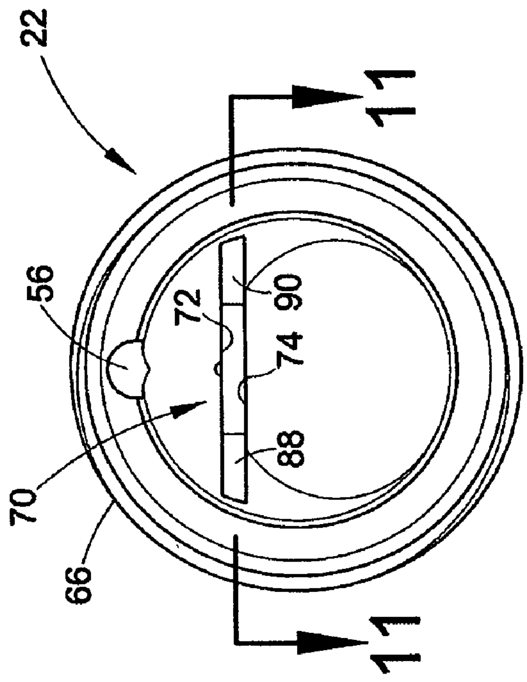
FIG. 8 is a front view of the nozzle assembly of FIG. 2.
Figure 7:
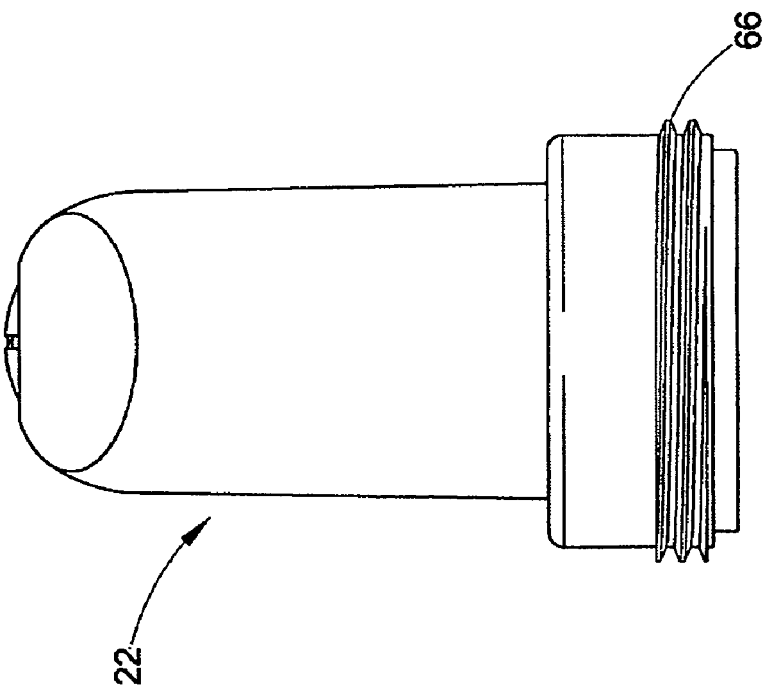
FIG. 7 is a bottom view of the nozzle assembly of FIG. 2.
Figure 11:
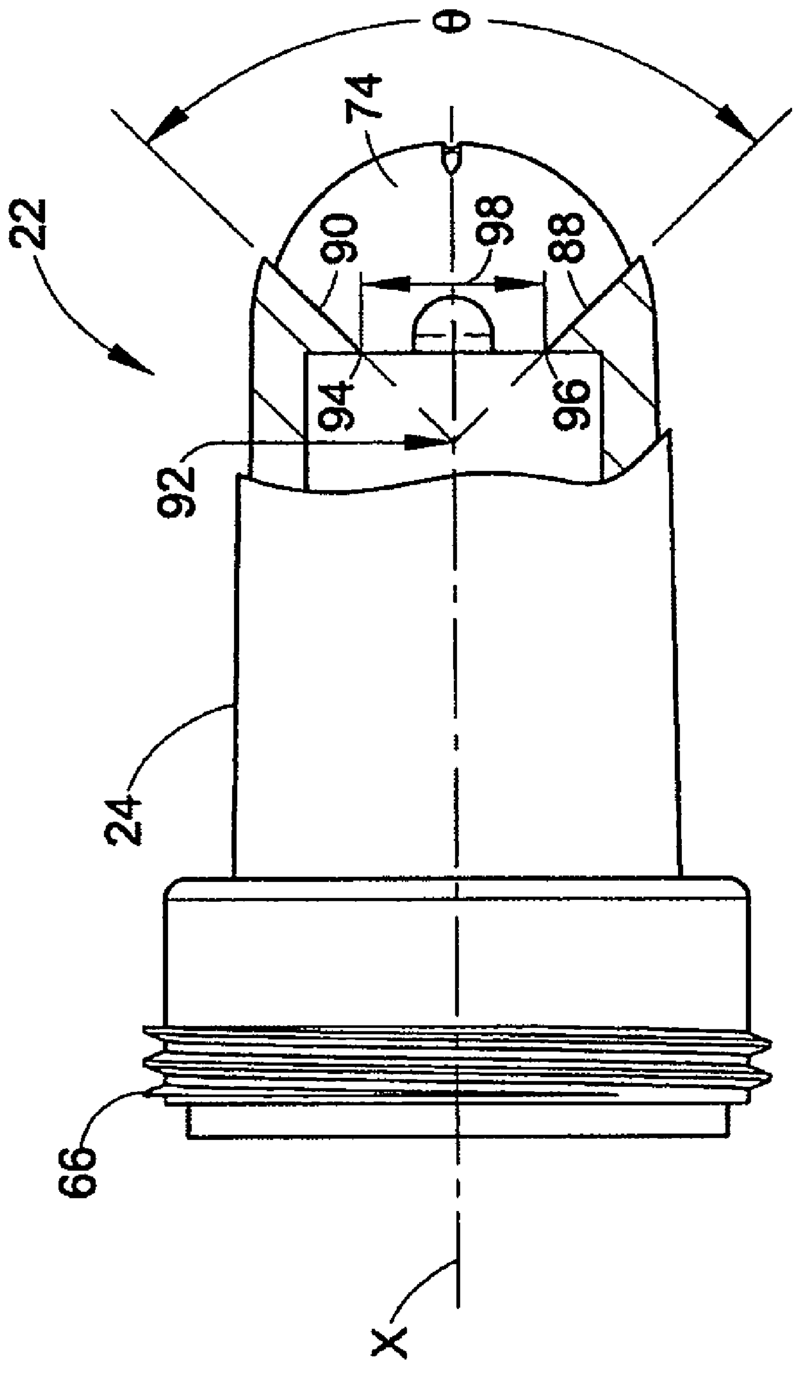
FIG. 11 is a bottom view in partial cross-section of the nozzle assembly of FIG. 2.

With reference to FIGS. 8 and 11, the slot 70 is not only defined by the first and second generally parallel surfaces 72, 74, but also by two lateral sidewalls 88, 90. FIG. 11 is a partial cross-section taken along the line 11-11 of FIG. 8. The sidewalls 88, 90 define an included angle $\theta$, which in the example of FIG. 11 is about 90°. This angle generally determines the width of the outlet spray pattern P, but may also influence weight distribution within the pattern or other attributes of the spray pattern, along with the various other features such as the amount of added air, the angles $\alpha$ and $\beta$, the length Y and so forth. The angle $\theta$, therefore, may be chosen based in part on the desired width of the outlet spray pattern. The sidewalls 88, 90 may be machined, for example, or the entire nozzle shell 24 may be molded with the sidewalls 88, 90 formed by the appropriate mold.

Note that the angle $\theta$ can be considered to originate at a virtual vertex 92, and that the sidewalls terminate at edges 94, 96 respectively so as to define an opening 98 through which the powder flow passes into and through the slot 70. It is preferred though not required that the opening 98—for example, the cross-sectional area—be about the same as the opening dimension 100 such as cross-sectional area (FIG. 3) at the outlet end of the filter 28 so as to maintain a constant flow velocity. When the angle θ is changed, however, the dimension 98 will also change. For example, if θ were 75°, the opening 98 area—presuming all other dimensions remained the same—would be smaller and thus no longer allow full flow velocity from the filter 28 into the slot 70. Accordingly, the virtual vertex 92 may be shifted so as to compensate for the change in angle θ. In the example of a smaller θ such as 75°, the vertex 92 would be shifted left (as viewed in FIG. 11) relative to the 90° position of FIG. 11, to an appropriate position so that the opening 98 dimension matched the opening 100 dimension. Conversely, if θ were larger, say 110°, the virtual vertex 92 would be shifted to the right (as viewed in FIG. 11) relative to the 90° position of FIG. 11, to an appropriate position so that the opening 98 dimension matched the opening 100 dimension. In this manner, regardless of the size of the included angle θ, the nozzle 22 will produce a repeatable output flow velocity. Alternatively, or in addition to shifting the vertex 92, the width or gap of the slot 70 between the surfaces 72, 74 may also be changed to adjust the overall cross-sectional area the slot 70 presents to powder flowing from the opening 100 into the slot 70. Of course, there may be applications wherein maintaining a close match between the openings 98 and 100 is not needed or wherein a mismatch may be used to adjust or change the output spray pattern or velocity or other characteristic.

It is important to note that the various nozzle components of the exemplary embodiment illustrated herein may be optional depending on the spray gun used, pattern shapes desired and so on. Therefore, in one broader sense the present disclosure is directed to a nozzle, that includes an off axis outlet so that a primary flow of powder along an axis (such as for example the axis X) will encounter at least one obstacle—for example the surface 76—to help atomize the powder and create turbulence to further facilitate atomization and outlet spray pattern definition including but not limited to pattern shape, weight distribution, velocity, direction and so on. The nozzle may also include additional features such as the second surface 82, the parallel surface slot 70, the curved transition surface 86, variations in the angles α, β, and θ, and so on, including selectable subsets and variations of these features.

The present disclosure also contemplates various methods that may be effected by use of one or more of the features described above. For example, a method for atomizing a powder stream having a main portion that flows primarily along an axis, and is directed against an obstructing surface to redirect the flow along a different direction before exiting through an outlet or slot that is off axis relative to the original flow axis. Additional steps may include redirecting the flow back to a direction that is generally parallel the initial flow axis as the powder exits the outlet or slot, and also using only a single outlet or slot.

Figure 10A:
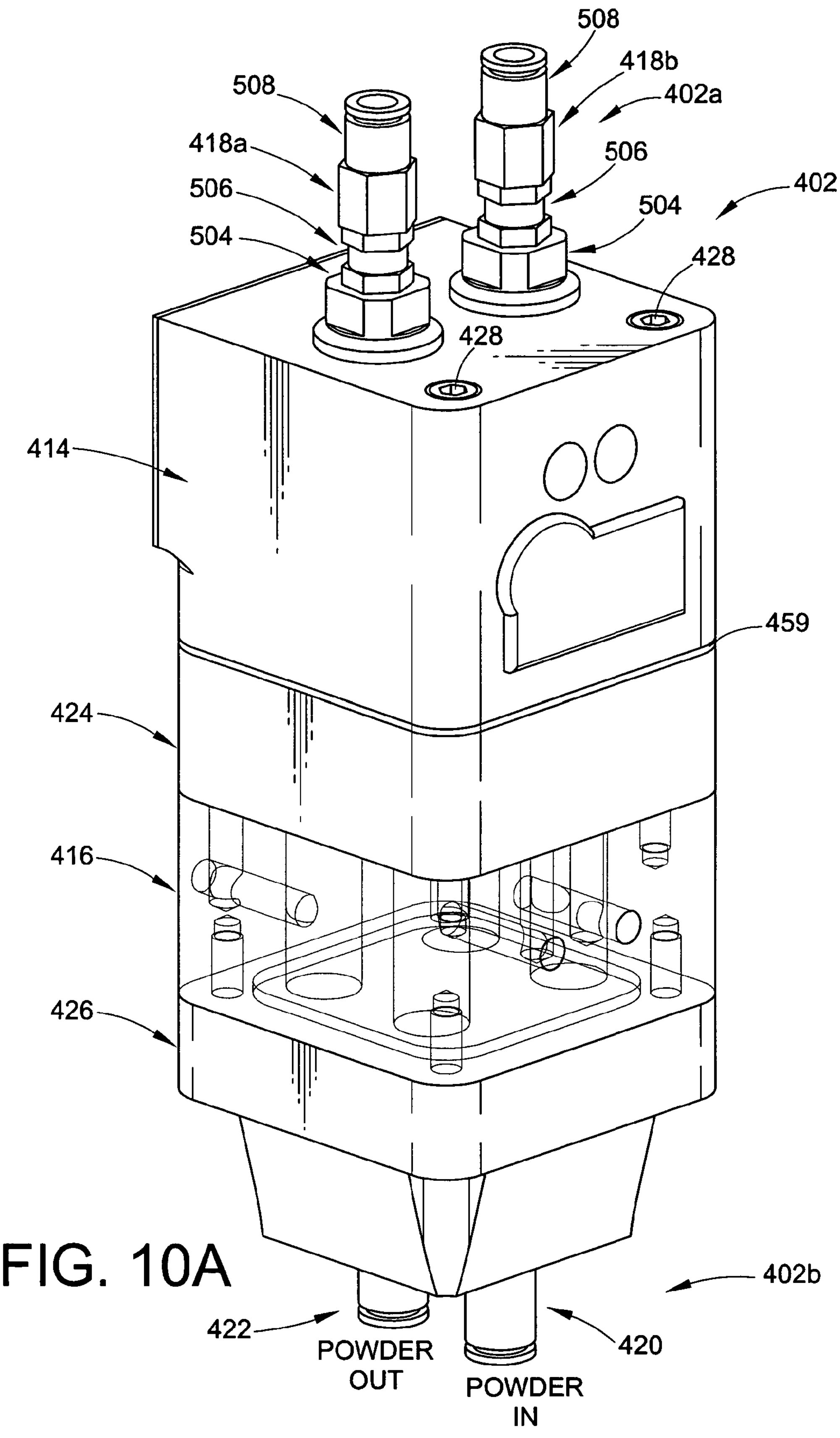
FIGS. 10A-10C are assembled and exploded isometric views of a dense phase pump embodiment that may be used in the exemplary system of FIG. 1.
Figure 10B:
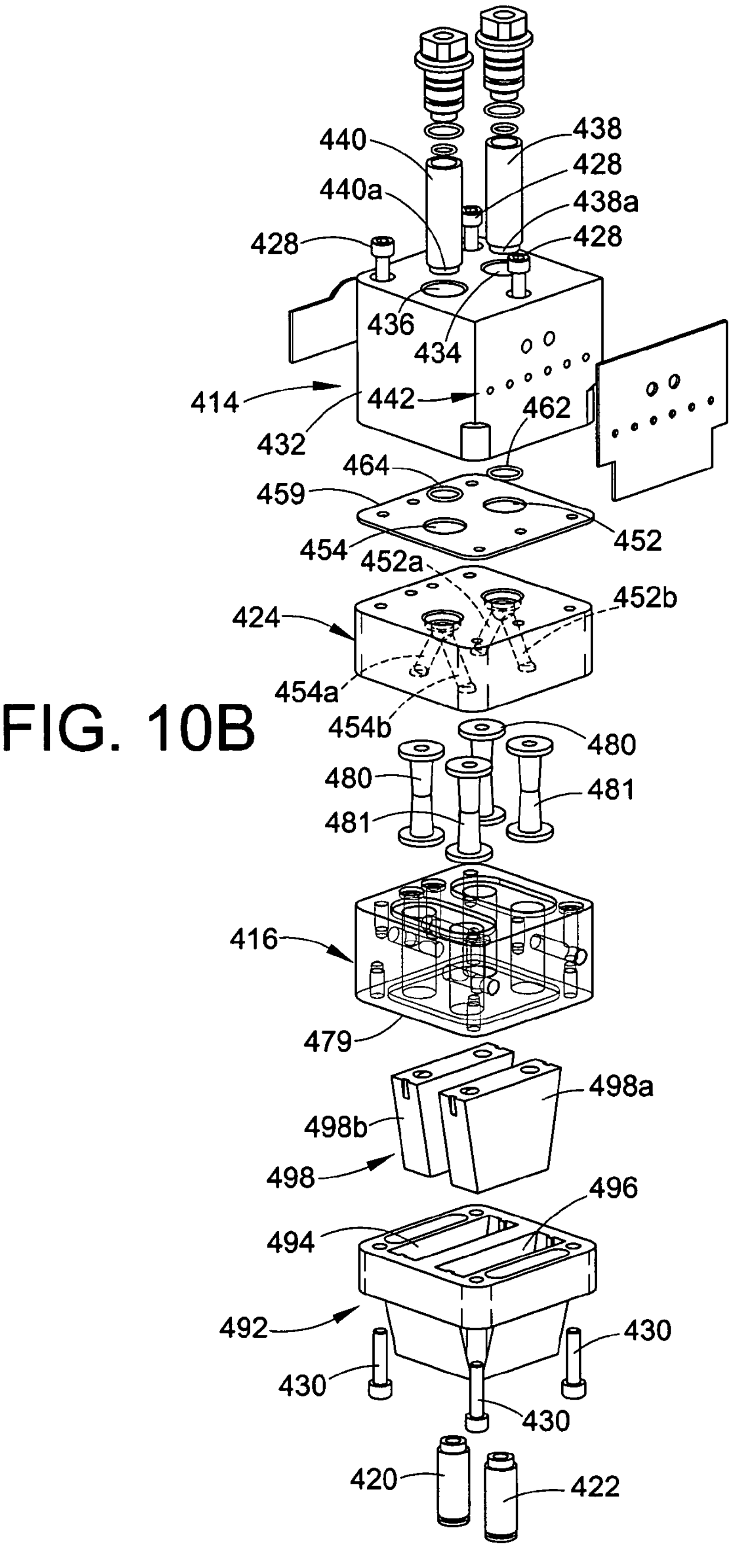
Figure 10C:
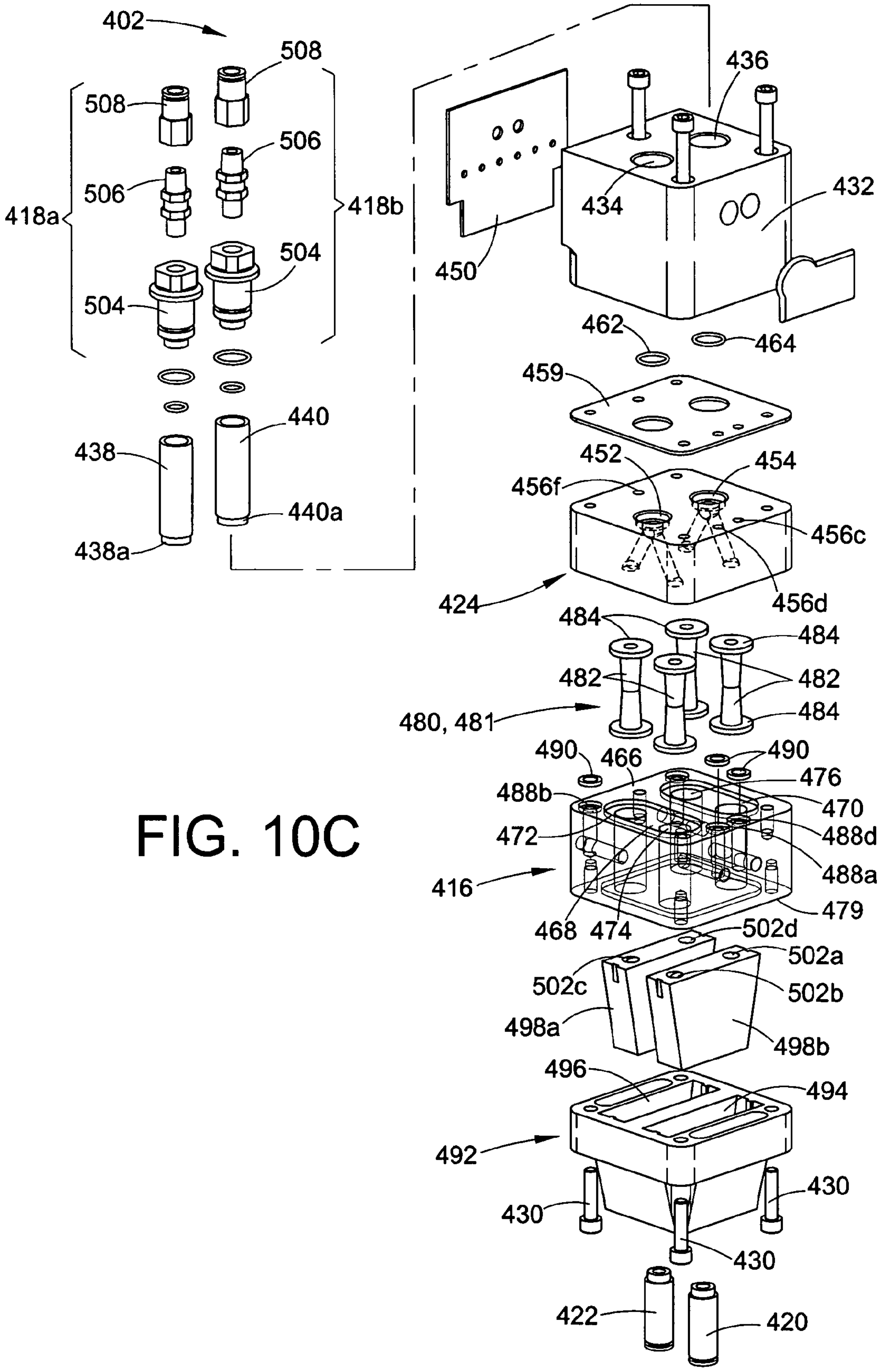

With reference to FIGS. 10A, 10B and 10C there is illustrated an exemplary embodiment of a dense phase pump 402 that may be used as part of the powder supply 20 in the exemplary system of FIG. 1. Although the pump 402 can be used as a transfer pump as well, it is particularly designed as a gun pump for supplying material to the spray gun 12.

The pump 402 is preferably although need not be modular in design. The modular construction of the pump 402 is realized with a pump manifold body 414 and a valve body 416. The manifold body 414 houses a pair of pump chambers along with a number of air passages as will be further explained herein. The valve body 416 houses a plurality of valve elements as will also be explained herein. The valves respond to air pressure signals that are communicated into the valve body 416 from the manifold body 414. Although the exemplary embodiments herein illustrate the use of pneumatic pinch valves, those skilled in the art will readily appreciate that various aspects and advantages of the present invention can be realized with the use of other control valve designs other than pneumatic pinch valves.

The upper portion 402*a* of the pump is adapted for purge air arrangements 418*a* and 418*b*, and the lower portion 402*b* of the pump is adapted for a powder inlet hose connector 420 and a powder outlet hose connector 422. A powder feed hose (not shown) is connected to the inlet connector 420 to supply a flow of powder from a supply such as the feed hopper 20 (FIG. 1). A powder supply hose 18 (FIG. 1) is used to connect the outlet 422 to a spray applicator whether it be a manual or automatic spray gun positioned up at the spray booth (not shown). The powder supplied to the pump 402 may, but not necessarily must, be fluidized.

Powder flow into an out of the pump 402 thus occurs on a single end 402*b* of the pump. This allows a purge function 418 to be provided at the opposite end 402*a* of the pump thus providing an easier purging operation as will be further explained herein.

If there were only one pump chamber (which is a useable embodiment of the invention) then the valve body 416 could be directly connected to the manifold because there would only be the need for two powder paths through the pump. However, in order to produce a steady, consistent and adjustable flow of powder from the pump, two or more pump chambers are provided. When two pump chambers are used, they are preferably operated out of phase so that as one chamber is receiving powder from the inlet the other is supplying powder to the outlet. In this way, powder flows substantially continuously from the pump. With a single chamber this would not be the case because there is a gap in the powder flow from each individual pump chamber due to the need to first fill the pump chamber with powder. When more than two chambers are used, their timing can be adjusted as needed. In any case it is preferred though not required that all pump chambers communicate with a single inlet and a single outlet.

In accordance with one aspect of the present invention, material flow into and out of each of the pump chambers is accomplished at a single end of the chamber. This provides an arrangement by which a straight through purge function can be used at an opposite end of the pump chamber. Since each pump chamber communicates with the same pump inlet and outlet in the exemplary embodiment, additional modular units are used to provide branched powder flow paths in the form of Y blocks.

A first Y-block 424 is interconnected between the manifold body 414 and the valve body 416. A second Y-block 426 forms the inlet/outlet end of the pump and is connected to the side of the valve body 416 that is opposite the first Y-block 424. A first set of bolts 428 are used to join the manifold body 414, first Y-block 424 and the valve body 416 together. A second set of bolts 430 are used to join the second Y-block 426 to the valve body 416. Thus the pump in FIG. 10A when fully assembled is very compact and sturdy, yet the lower Y-block 426 can easily and separately be removed for replacement of flow path wear parts without complete disassembly of the pump. The first Y-block 424 provides a two branch powder flow path away from each powder chamber. One branch from each chamber communicates with the pump inlet 420 through the valve body 416 and the other branch from each chamber communicates with the pump outlet 422 through the valve body 416. The second Y-block 426 is used to combine the common powder flow paths from the valve body 416 to the inlet 420 and outlet 422 of the pump. In this manner, each pump chamber communicates with the pump inlet through a control valve and with the pump outlet through another control valve. Thus, in the exemplary embodiment, there are four control valves in the valve body that control flow of powder into and out of the pump chambers.

The manifold 414 includes a body 432 having first and second bores therethrough 434, 436 respectively. Each of the bores receives a generally cylindrical gas permeable filter member 438 and 440 respectively. The gas permeable filter members 438, 440 include lower reduced outside diameter ends 438*a* and 440*a* which insert into a counterbore inside the first Y-block 424 which helps to maintain the members 438, 440 aligned and stable. The upper ends of the filter members abut the bottom ends of purge air fittings 504 (FIG. 10A) with appropriate seals as required. The filter members 438, 440 each define an interior volume that serves as a powder pump chamber so that there are two pump powder chambers provided in this embodiment. A portion of the bores 434, 436 are adapted to receive the purge air arrangements 418*a* and 418*b*.

The filter members 438, 440 may be identical and allow a gas, such as ordinary air, to pass through the cylindrical wall of the member but not powder. The filter members 438, 440 may be made of porous polyethylene, for example. This material is commonly used for fluidizing plates in powder feed hoppers. An exemplary material has about a forty micron opening size and about a 40-50% porosity. Such material is commercially available from Genpore or Poron. Other porous materials may be used as needed. The filter members 438, 440 each have a diameter that is less than the diameter of its associated bore 434, 436 so that a small annular space is provided between the wall of the bore and the wall of the filter member. This annular space serves as a pneumatic pressure chamber. When a pressure chamber has negative pressure applied to it, powder is drawn up into the powder pump chamber and when positive pressure is applied to the pressure chamber the powder in the powder pump chamber is forced out.

The inventions have been described with reference to the exemplary embodiments. Modifications and alterations will occur to others upon a reading and understanding of this specification. It is intended to include all such modifications and alterations insofar as they come within the scope of the appended claims or the equivalents thereof.

Having thus described the inventions, we claim:

1. A powder spray system, comprising:

a powder spray gun having a gun housing and a spray nozzle that can be mounted on the powder spray gun housing, a supply of powder coating material and a pump, the pump comprising a pump chamber defined by an interior volume of a gas permeable filter member, an inlet valve and an outlet valve to control flow of powder into and out of the pump chamber, the pump drawing powder from the supply into the pump chamber when the inlet valve is open and the outlet valve is closed, and pushing the powder out of the pump chamber to the spray gun when the outlet valve is open and the inlet valve is closed, the spray nozzle comprising a nozzle shell having a powder inlet, an outlet through which powder exits as a spray pattern, a powder flow path between the powder inlet and the outlet, an electrode at the spray nozzle, an air inlet to provide pressurized air to the spray nozzle that is supplied to the air inlet through one or more air channels in the spray gun housing, and a filter disposed within said nozzle shell through which air from said air inlet flows to be added to the powder before the powder exits the nozzle outlet, wherein the filter comprises a surface that forms at least part of the powder flow path.

2. The spray nozzle of claim 1 wherein said filter is generally conical.

3. The spray nozzle of claim 2 wherein said filter comprises a truncated cone.

4. The spray nozzle of claim 1 wherein said filter comprises a hollow body.

5. The spray nozzle of claim 4 wherein said body comprises a material that is porous to air.

6. The spray nozzle of claim 5 wherein said material comprises sintered polypropylene.

7. The spray nozzle of claim 1 wherein the pump delivers powder to the spray nozzle in dense phase.

8. The spray nozzle of claim 1 wherein said outlet is radially offset from a longitudinal axis of said filter.

9. The spray nozzle of claim 8 wherein powder flowing longitudinally through the nozzle impacts an obstructing surface before flowing through said outlet.

10. The spray nozzle of claim 8 wherein said outlet spray pattern is generally along an axis that is parallel to said longitudinal axis of said filter.

11. The spray nozzle of claim 1 comprising a member between the air inlet and the filter, the member having a plurality of apertures through which pressurized air flows to the filter.

12. The spray nozzle of claim 1 wherein the spray nozzle comprises a nozzle shell and an insert in the nozzle shell that holds the filter.

13. A nozzle for a powder spray gun, comprising:

a nozzle body having a flow path for powder along a main flow axis, said nozzle body comprising an outlet that is off axis relative to said main flow axis so that powder flowing along said main flow axis is redirected by an obstructing surface to said outlet, wherein powder flows through said outlet in a spray pattern along an axis that is generally parallel to and radially offset from said main flow axis.

14. The spray nozzle of claim 13 wherein said outlet comprises a slot that is radially offset from said main flow axis.

15. The spray nozzle of claim 14 wherein powder flows through said slot in an outlet spray pattern that is generally parallel to said main flow axis.

16. The spray nozzle of claim 15 wherein said slot comprises two generally parallel surfaces that are parallel to and radially offset from said main flow axis.

17. The spray nozzle of claim 14 comprising an air porous filter within said nozzle body for adding air to powder before the powder passes through said outlet.

18. The spray nozzle of claim 17 wherein said filter comprises a frusto-conical internal surface having an outlet end disposed near an inlet end of said slot.

19. The spray nozzle of claim 18 wherein a cross-sectional area of said filter outlet end is about the same value as a cross-sectional area of said inlet end of said slot.

20. The spray nozzle of claim 18 wherein a portion of said filter internal surface is contiguous with an internal surface of said slot.

21. The spray nozzle of claim 20 wherein said slot internal surface comprises a curved surface that adjacent said portion of said filter internal surface so that powder flowing near said filter internal surface are redirected into a central flow portion before passing out said slot.

22. The spray nozzle of claim 13 in combination with a spray gun.

23. The spray nozzle of claim 13 in combination with a powder coating system comprising a powder supply.

24. The spray nozzle of claim 13 wherein said outlet comprises a slot having an inlet portion, said nozzle body comprises a frusto-conical internal surface having an outlet end disposed near said inlet portion of said slot, and said obstructing surface comprises an angled surface that redirects powder flow from said main flow axis toward said inlet portion of said slot.

25. The spray nozzle of claim 24 wherein said angled surface in cross-section is at an angle α relative to said main flow axis so that powder flowing along said main flow axis impinges said angled surface and is redirected toward said slot inlet portion.

26. The spray nozzle of claim 25 wherein said angle α is about 45° to about 85°.

27. The spray nozzle of claim 25 wherein said angle α is about 55° to about 70°.

28. The spray nozzle of claim 25 wherein said angle α is about 60° to about 64°.

29. The spray nozzle of claim 24 wherein said angled surface comprises low impact fusion plastic.

30. A method for spraying powder coating material, comprising the steps of:

causing powder to flow primarily along a first path, causing the powder to impact a first obstructing surface to change flow direction of the powder towards a second obstructing surface along a second path, and causing the powder to impact said second obstructing surface to redirect the powder towards an outlet that is off axis relative to said first path.

31. The method of claim 30 wherein said spray pattern is generally parallel to said first path.

32. A nozzle for a powder spray gun, comprising:

a nozzle body having a flow path for powder along a main flow axis, said nozzle body comprising an outlet that is off axis relative to said main flow axis, a first internal surface and a second internal surface, said first internal surface redirecting powder flow from said main flow axis towards said second surface, said second surface directing powder flow to said outlet.

33. The nozzle of claim 32 wherein said second surface lies in a plane that is generally parallel to said main flow axis.

34. The nozzle of claim 32 wherein said outlet is provided by an outlet slot and further wherein said second surface forms at least a part of an outlet slot.

35. The nozzle of claim 32 comprising an air inlet, and a filter disposed within said nozzle shell through which air from said air inlet is added to the powder before exiting the nozzle.

36. The nozzle of claim 35 wherein said filter comprises a surface that forms at least part of the powder flow path.

37. The nozzle of claim 35 wherein said filter is generally conical.

38. The nozzle of claim 37 wherein said filter comprises a truncated cone.

39. The nozzle of claim 35 wherein said filter comprises a hollow body.

40. The nozzle of claim 39 wherein said body comprises a material that is porous to air.

41. The spray nozzle of claim 40 wherein said material comprises sintered polypropylene.

42. A powder spray gun, comprising:

a spray gun housing and a spray nozzle connectable to said spray gun housing, said spray nozzle comprising a nozzle body having a flow path for powder along a main flow axis, said nozzle body comprising an outlet that is off axis relative to said main flow axis so that powder flowing along said main flow axis is redirected by an obstructing surface to said outlet, wherein powder flows through said outlet in a spray pattern along an axis that is generally parallel to and radially offset from said main flow axis.

43. A powder spray gun, comprising:

a spray gun housing and a spray nozzle connectable to said spray gun housing, said spray nozzle comprising a nozzle body having a flow path for powder along a main flow axis, said nozzle body comprising an outlet that is off axis relative to said main flow axis, a first internal surface and a second internal surface, said first internal surface redirecting powder flow from said main flow axis towards said second surface, said second surface directing powder flow to said outlet.

44. A spray gun, comprising:

a housing, an air passage within the housing that is connectable to a supply of pressurized air that flows through the air passage, a first powder flow passage within the housing that is connectable to a supply of powder coating material that flows through the first powder flow passage, a nozzle attached to the housing, the nozzle having a second powder flow passage through which powder coating material flows after flowing through the first powder flow passage, and a filter disposed within the nozzle, the nozzle defines a volume surrounding the filter, the air passage being in fluid communication with the volume, a member having a plurality of apertures, the member being located between the air passage and the volume, whereby pressurized air flows from the air passage, through the apertures into the volume, and from the volume through the filter to mix with the powder coating material flowing through the nozzle, the filter forming at least a part of the second powder flow passage.

45. The spray gun of claim 44 wherein the volume is an enclosed volume.

46. The spray gun of claim 44 wherein the member is electrically conductive.

47. The spay gun of claim 44 wherein the nozzle comprises a nozzle shell and an insert, and wherein the insert is received within the nozzle shell.

48. The spray gun of claim 47 wherein the filter is disposed within the insert and the volume is between an outside surface of the filter member and the insert.

49. The spray gun of claim 44 wherein the filter is conical.

50. A method for spraying powder coating material from a powder spray gun having a nozzle with a nozzle outlet, comprising:

opening an inlet powder flow passage to a pump chamber;

drawing powder into the pump chamber through the inlet powder flow passage by applying suction to the pump chamber;

closing the inlet powder flow passage and opening an outlet powder flow passage;

pushing the powder out of the pump chamber through the outlet powder flow passage into a powder flow path by applying positive pressure to the pump chamber;

introducing air into the powder flow path between the pump chamber and the nozzle outlet to mix with the powder in the powder flow path; and spraying the powder from the nozzle outlet as a powder spray pattern, wherein the step of introducing air into the powder flow path comprises forcing pressurized air through a filter; and wherein an interior surface of the filter forms part of the powder flow path.

51. The method of claim 50 wherein the filter is disposed in the spray gun.

52. The method of claim 50 wherein the filter is disposed in the spray gun nozzle.

53. The method of claim 50 wherein the step of introducing air into the powder flow path comprises introducing air into a portion of the powder flow path in the spray gun.

54. The method of claim 53 wherein the step of introducing air into the powder flow path comprises introducing air into a portion of the powder flow path in the spray gun nozzle.

* * * * *